United States Patent [19]

Suzuki

[11] Patent Number: 5,307,773
[45] Date of Patent: May 3, 1994

[54] SQUISH STRUCTURE FOR SPARK IGNITION ENGINE

[75] Inventor: Toshio Suzuki, Iwata, Japan

[73] Assignee: Yamaha Hatsudoki Kabushiki Kaisha, Iwata, Japan

[21] Appl. No.: 959,160

[22] Filed: Oct. 9, 1992

[30] Foreign Application Priority Data

Oct. 11, 1991 [JP] Japan ................................. 3-292097
Oct. 11, 1991 [JP] Japan ................................. 3-292098

[51] Int. Cl.$^5$ ............................................. F02B 19/18
[52] U.S. Cl. ................................. 123/293; 123/260; 123/286; 123/661; 123/667
[58] Field of Search ................... 123/193.5, 260, 286, 123/293, 661, 667

[56] References Cited

U.S. PATENT DOCUMENTS

| | | | |
|---|---|---|---|
| 3,270,721 | 9/1966 | Hideg et al. | 123/268 |
| 4,191,136 | 3/1980 | Matsumoto | 123/661 |
| 4,788,942 | 12/1988 | Pouring et al. | 123/667 |

Primary Examiner—Noah P. Kamen
Attorney, Agent, or Firm—Knobbe, Martens, Olson & Bear

[57] ABSTRACT

A number of embodiments of combustion chamber configurations for internal combustion engines incorporating squish areas for promoting turbulence and rapid flame propagation in the main combustion chamber volume. A pre-combustion chamber volume is formed in at least one of the squish areas and communicates with the main combustion chamber volume through flow channels that are substantially unrestricted except when the piston is at its top dead center position for reducing pumping losses and insuring complete combustion within the squish area.

16 Claims, 7 Drawing Sheets

SQUISH STRUCTURE FOR SPARK IGNITION ENGINE

BACKGROUND OF THE INVENTION

This invention relates to a squish structure for a spark ignition engine and more particularly to an improved combustion chamber configuration for an internal combustion engine.

The use of combustion chambers having squish action in internal combustion engines are well known. With such combustion chambers, the piston, cylinder bore and cylinder head define a relatively large combustion chamber volume at top dead center position of the piston. Along at least one side of this combustion chamber volume there is defined a relatively narrow squish area. As the piston approaches top dead center, the charge which is compressed in the squish area is driven at a high velocity into the larger combustion chamber area to create turbulence and improve flame propagation.

Although such squish type combustion chambers do promote turbulence and improve some running characteristics of the engine, the squish volume itself forms an area which gives rise to incomplete combustion. That is, although the squish area is effective for creating turbulence in the main combustion chamber volume, the rapid flame propagation in the main combustion chamber volume cannot propagate into the restricted squish area and as result any fuel in the squish area will not be completely burnt during running. This obviously gives rise to poor fuel economy and high exhaust gas emissions.

In addition to this problem, the squish area is generally cooled more than the remainder of the combustion chamber because of its actual configuration and the fact that is has a smaller volume to surface area than the main combustion chamber. As a result, a quenching action occurs in the squish area which further deteriorates the combustion in this area. In addition, the delayed combustion caused by the squish area can give rise to problems in knocking or pre-ignition.

An arrangement has been proposed where a pre-chamber communicates with the squish area through a restricted throat. The purpose of this concept is to cause combustion to occur in this small chamber and this flame is then suppose to propagate into the squish area through the restricted throat. Although this concept appears feasible, the fact that there is a restricted throat that communicates the squish area with the small pre-chamber gives rise to significant pumping losses and, therefore, the system does not work as planned. In addition, the small throat area causes throttling of the burning charge which issues from the pre-chamber and this causes heat loss which further diminishes the efficiency of such arrangements.

It is, therefore, a principal object to this invention to provide an improved combustion chamber configuration for an internal combustion engine.

It is a further object to this invention to provide an improved combustion chamber configuration that embodies a squish area for creating turbulence in the main combustion chamber volume but which also incorporates an arrangement for insuring complete combustion of the charge in the squish area without throttling and pumping losses.

Even if a small pre-chamber communicates in an unrestricted fashion with the squish area to promote combustion in the squish area, there may be times when combustion cannot or will not be initiated in the small pre-chamber.

It is, therefore a still further object to this invention to provide an improved combustion chamber configuration including a squish area at a pre-chamber and wherein it is insured that combustion will always be initiated in the pre-chamber.

SUMMARY OF THE INVENTION

This invention is adapted to be embodied in a combustion chamber for an internal combustion engine that is comprised of a pair of relatively moveable components which define a combustion chamber. The combustion chamber, at its minimum volume condition, is comprised of a main combustion chamber volume and a squish area of substantially lesser height than the main combustion chamber volume and which is disposed on at least one side of the main combustion chamber volume. A pre-chamber volume of greater height than the squish area is disposed within the squish area. A flow channel exists from the main combustion chamber volume to the pre-chamber volume for flow therebetween and this flow channel is substantially unrestricted until the relatively movable components closely approach their minimum volume condition for promoting the flow of a mixture into the pre-chamber volume as the components approach their minimum volume condition and for delivering a burning charge into the squish area after combustion has initiated in the pre-chamber volume.

DETAILED DESCRIPTION OF THE PREFERRED EMBODIMENTS OF THE INVENTION

Figure 1:
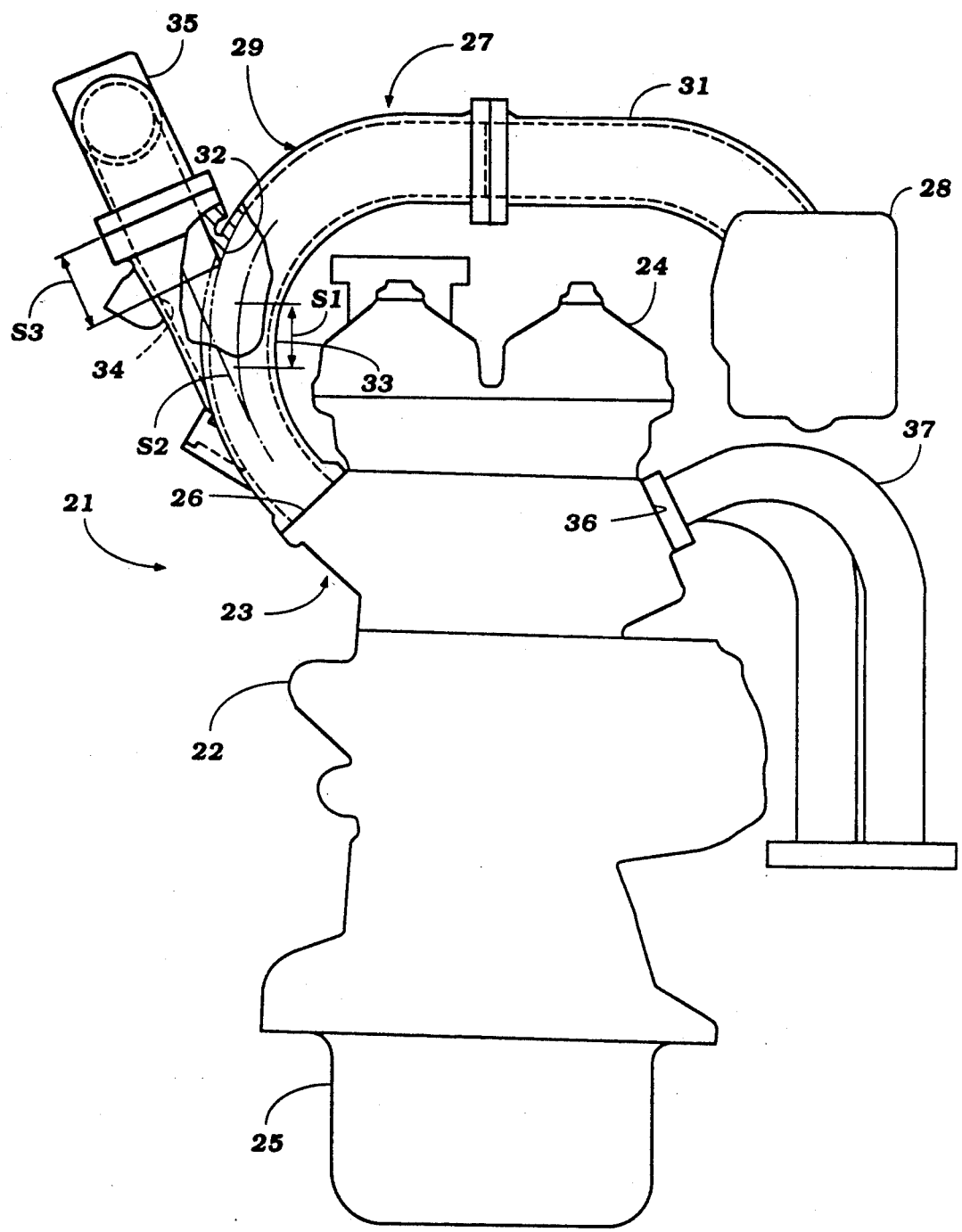
FIG. 1 is an end elevational view of multiple cylinder, inline type, internal combustion engine constructed in accordance with a first embodiment of the invention, with a portion broken away.

Referring now in detail to the drawings and initially to FIG. 1, an inline, multiple cylinder, internal combustion engine constructed in accordance with an embodiment of the invention is identified generally by the reference numeral 21. Although the invention is described in conjunction with a such an engine, it should be readily apparent to those skilled in the art how the invention can be applied to engines having other. cylinder numbers and other cylinder configurations. In fact, certain facets of the invention may also be employed with rotating type of engines, as should also be apparent to those skilled in the art.

The engine 21 is comprised of a cylinder block 22 which, as has been noted, is formed with a plurality of inline cylinder bores, which will be described later by reference to the remaining figures. A cylinder head 23 is affixed to the cylinder block 22 in a suitable manner and carries an overhead camshaft arrangement which operates four valves per cylinder, as will also become apparent, and this cam mechanism is enclosed within a cam cover 24. A crankcase member 25 is affixed to the lower end of the cylinder block 22 and contains the crankshaft of the engine 21 and lubricant for the engine 21, which lubricant is circulated in any known manner.

In all of the embodiments of the invention illustrated, the left hand side of the engine is the intake side and the cylinder head 23 is provided with a surface 26 in which a plurality of aligned intake ports, later to be described, are positioned. An induction system, indicated generally by the reference numeral 27 is provided for supplying a charge to the combustion chambers of the engine. The induction system 27 is of the compound type and includes a plenum chamber 28 in which an air inlet opening is formed in which a throttle valve (not shown) is provided for controlling the engine speed. The plenum chamber 28 communicates with an intake manifold 29 through a plurality of runners 31 which may be formed integrally with the plenum chamber 28. The intake manifold 29 has respective runners 32 which have a generally arcuate configuration although there is provided a straight section 33 having a length S1. This straight section 33 is intersected by runners 34 of an auxiliary induction system 35. The auxiliary induction system 35 and specifically its runners 34 extend in a straight line S1 which intersects the curved portion of the runners 32 along a line S2 which is tangential to their curvature. This intersection is formed downstream of the straight section S1.

A portion S3 of the runners 34 is formed integral with the intake manifold 29. These runners are shorter than the runners 32 and the manifold runners 31 and are tuned to provide good charging efficiency for high speed operation. The longer runners 33 and manifold runners 31 are tuned to provide good performance at low engine speeds. If desired, throttle valves may control the opening and closing of the high speed runners 34 in a manner well known in this art.

The opposite side of the cylinder head 23 is provided with an exhaust surface 36 in which individual exhaust ports are formed which communicate with an exhaust manifold 37. The exhaust manifold 37 communicates with an exhaust system (not shown) for discharge of the exhaust gases to the atmosphere.

The construction as thus far described may considered to be conventional and, for that reason, further details of it are not believed to be necessary to understand the construction or operation of the invention, which relates to the combustion chamber and which will now be described by reference to the remaining figures.

Referring initially to the embodiment of Figures through 8, it will be seen that the cylinder block 22 is provided with, as aforenoted, cylinder bores 38 in which pistons 39 reciprocate. The pistons 39 are connected by means of piston pins 41 to the upper or small end of connecting rods 42. The lower ends of the connecting rods 42 (which are not shown) are suitably journalled on the individual throws of the aforenoted crankshaft.

The cylinder head 23 is provided with a lower sealing surface 42 which sealingly engages a cylinder head gasket 44 which has openings that align with the cylinder bores 38, as is well known in this art. In addition the cylinder head 23 is provided with individual recesses 45 which have a generally wedge shape and which define a portion of a main combustion chamber volume. The volume of the combustion chamber obviously varies cyclically as the pistons 39 reciprocate in the cylinder bore 43.

On one side of the cylinder head recesses 45, there are provided a pair of intake ports 46. A pair of intake valves 47 have head portions 48 that control the opening and closing of the intake ports 46 and stem portions 49 that are supported for reciprocation within intake valve guides 51 pressed into the cylinder head 23. Coil compression springs 52 encircle the valve stems 49 and bear against the cylinder head 23 and keeper retainer assemblies 53 fixed to the upper ends of the intake valve stems 49 for urging the intake valves 47 to their closed positions.

Thimble type tappets 54 are slidably supported in a cam carrier 55 that is affixed to the cylinder head 23 and associated with each of the intake valves 47. An intake camshaft 56, previously referred to, is rotatably journalled in the cam carrier 55 and operates the intake valves 47 in a well known manner.

The aforenoted intake ports formed in the cylinder head surface 26 communicate with intake passages 57 which are formed in the intake side of the cylinder head 23 and which terminate at the valve seats 46. If desired, the intake passages 57 may be individual for each valve seat 46 or may be of the siamesed type.

Exhaust ports 58 are formed o the opposite side of the combustion chamber recess 45 and exhaust valves 59 have head portions 61 that control the opening and closing of the exhaust ports 58. The exhaust valves 59 have stem portions 62 that are slidably supported within valve guides 63 pressed into the cylinder head 23. Coil compression springs 64 encircle the valve stems 62 and bear against the cylinder head 23 and keeper retainers 65 that are affixed to the upper ends of the exhaust valve stems 62 for urging the exhaust valve 59 to their closed positions. Thimble tappets 66 ar slidably supported within the cam carrier 55 and are actuated by an exhaust camshaft 67 for opening and closing the exhaust valves 59 in a well known manner.

The aforenoted exhaust ports that open through the cylinder head surface 38 merge into exhaust passages 68 which extend to the exhaust ports 58. Like the intake passages 57, the exhaust passages 68 may be either individual for each exhaust valve 59 or, alternatively, may be of the siamesed type.

The main combustion chamber recess 45 is formed by a surface 69 of the cylinder head 23 and a spark plug 71 is mounted centrally in this surface 69 and in the recess 45 for firing the fuel/air charge delivered thereto in a known manner.

In this embodiment of the invention, the recess 45 of the cylinder head 23 is offset to the intake side of the engine 21 as clearly shown in the figures. This is done so as to provide an intake side squish area 72 and a larger exhaust side squish area 73, which squish areas 72 and 73 lie on opposite sides of the cylinder head main combustion chamber recess 45. Because of this offset, the squish area 73 adjacent the exhaust valves 59 is greater than that on the intake side.

The construction of the combustion chamber as thus far described may be considered to be conventional, except for the offsetting concept just noted. By providing such squish areas in a conventional engine, as the piston 39 approaches top dead center position the charge in the combustion chamber will be forced from the squish areas 72 and 73 into the larger combustion chamber recess 45 to cause turbulence and improve the flame propagation in this chamber when the spark plug 71 is fired. As has been previously noted, however, the presence of the squish areas causes an area where the flame is impeded from propagating into them and also there will be quenching in the squish areas that can result in incomplete combustion of any fuel contained within the squish areas. To avoid these problems, the construction now to be described is incorporated into the combustion chamber configuration.

Figure 2:
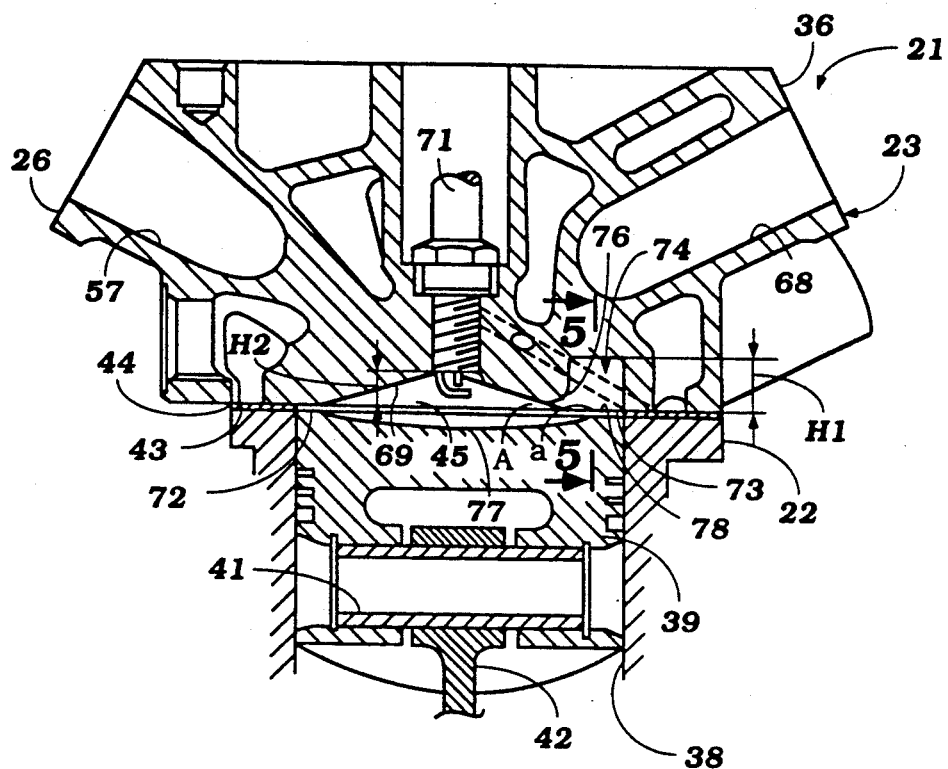
FIG. 2 is an enlarged cross sectional view taken through the upper portion of one of the cylinders of the engine on a plane perpendicular to that of FIG. 1.
Figure 3:
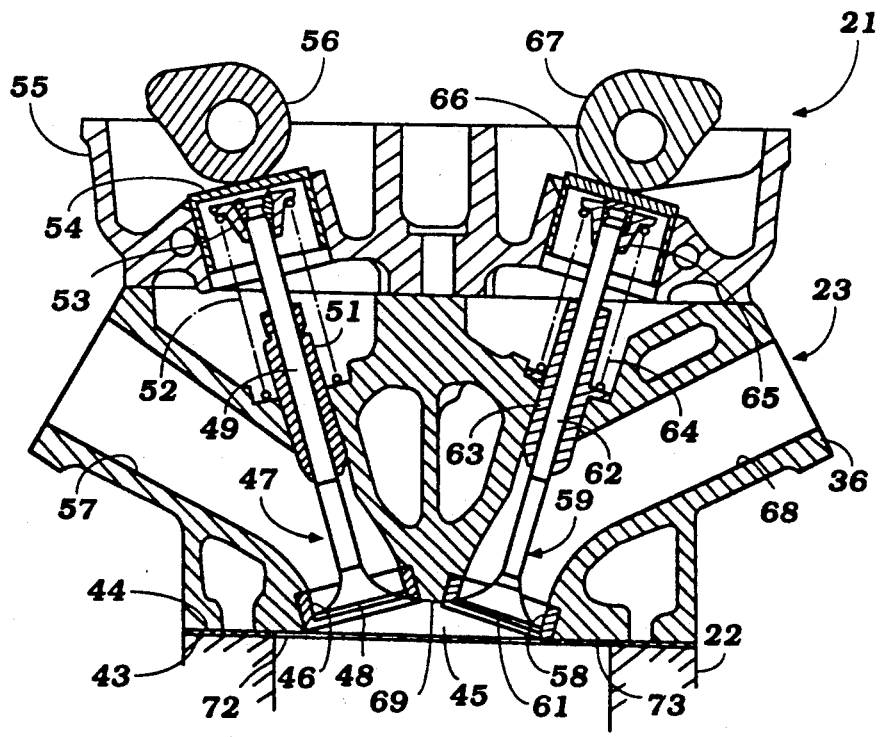
FIG. 3 is a cross sectional view taken along a plane perpendicular to the plane of FIG. 2 and parallel to the plane of FIG. 1.
Figure 4:
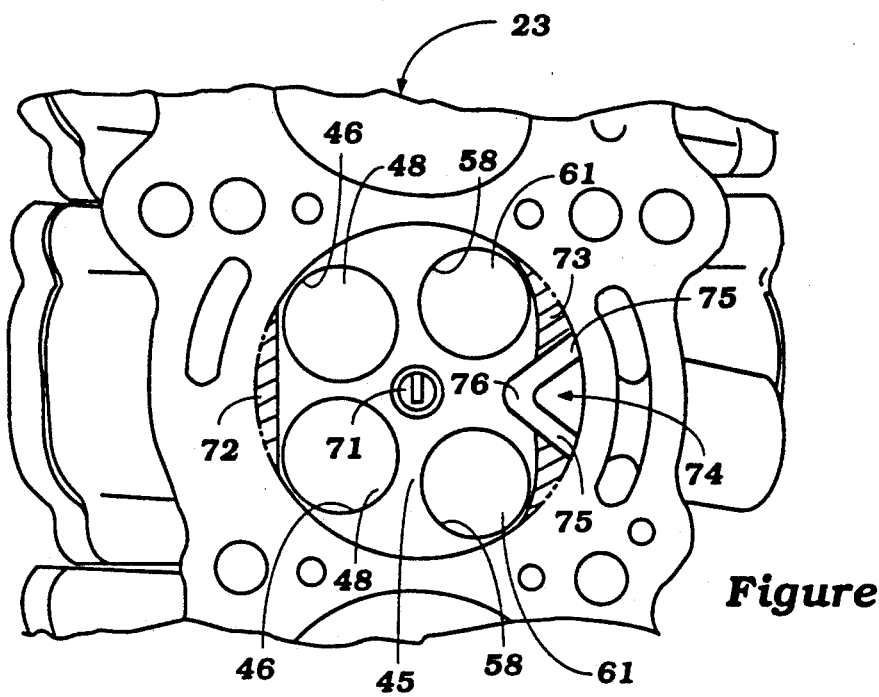
FIG. 4 is a bottom plan view showing the configuration of the cylinder head.
Figure 5:
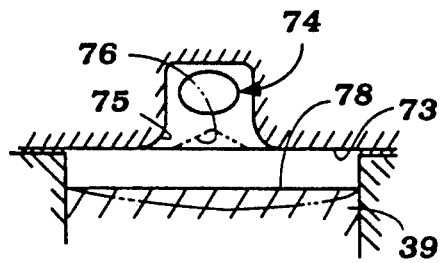
FIGS. 5 through 8 are cross sectional views taken along the line 5—5 of FIG. 2 showing the configuration as the piston approaches and finally reaches top dead center position.
Figure 6:
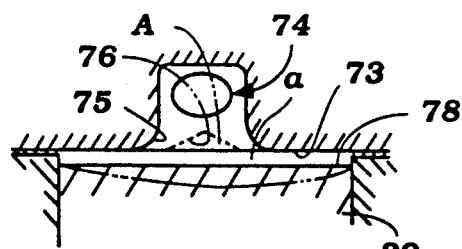
Figure 7:
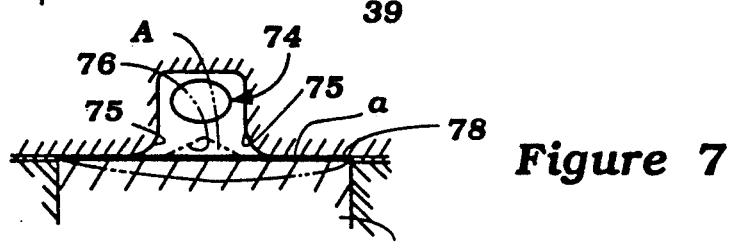
Figure 8:
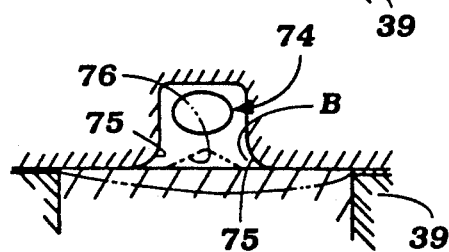

In accordance with the invention, a pre-chamber 74 is provided within the squish area 73 on the side of the combustion chamber adjacent the exhaust valves 59. In the illustrated embodiments, the pre-chamber 74 is formed by a recess in the cylinder head 23 and as may be clearly seen in FIG. 2, the height H1 of this pre-chamber 74 is greater than the height H2 of the main combustion chamber recess 45. The pre-chamber 74 has a generally triangular configuration shown in bottom plan view (FIG. 4). In accordance with an important feature of the invention, there are provided a pair of angularly disposed flow passages 75 formed in the underside of the cylinder head 23 and which meet at an apex 76 that is disposed in a line connecting the spark plug 71 with the center of the pre-chamber 74 and which is disclosed fairly close to the spark plug 71. The channels 75 serve two purposes. First, as the piston 39 approaches top dead center position, the passages 75 form a flow area which is substantially unrestricted until the pistons 39 closely approach top dead center so as to insure that a charge can enter the pre-chamber 74 with substantially no restriction. This may be seen in FIGS. 5 through 8.

It should be noted that in the illustrated embodiment, the piston 39 is formed with a slight central bowl 77 surrounded by the main head portion 78. When the piston 39 is approaching top dead center (FIG. 5) the flow channels 75 are substantially unrestricted and flow can pass easily into the pre-chamber 74. As the piston 39 continues to move toward top dead center, FIGS. 6 and 7, the flow channels 75 will become somewhat restricted but generally there will be little interference with the flow into the pre-chamber 74. Of course, this does not interfere with the squish action which will otherwise occur in the remainder of the chamber. When the piston 39 is at fully top dead center position (FIG. 8) the flow channels 75 will be somewhat restricted but at this point there will be no pumping losses occur since there is little actual flow.

When the spark plug 71 is fired, there will be a rapid pressure rise in the main combustion chamber volume 45 and this will cause further pressurization of the pre-chamber 74 through the flow channels 75. The charge which has been delivered to the pre-chamber 74 will then self ignite.

In addition, the flame can flow directly from the combustion chamber 45 through the passages 75 into the pre-chamber 74 to initiate combustion timing. This bruning charge can then flow from the passages 75 into the squish area 73 so as to insure complete combustion of any fuel in this area.

Figure 9:
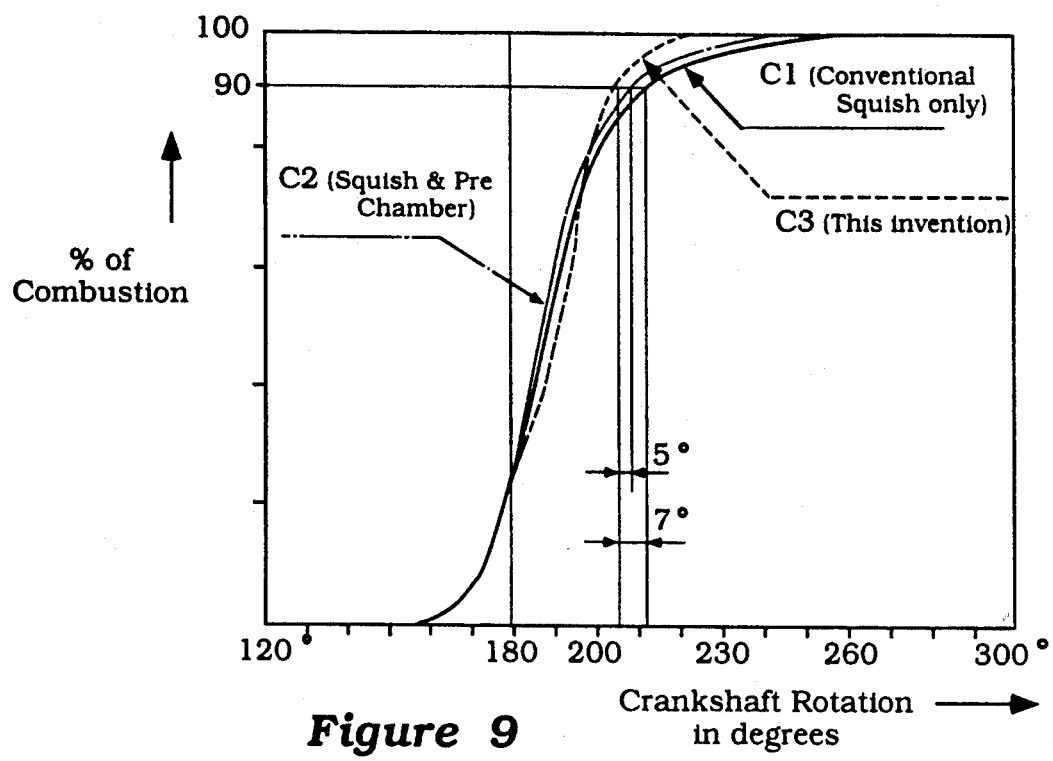
FIG. 9 is a graphically view showing the way in which combustion occurs in the combustion chamber as the piston approaches top dead center with a conventional engine (C1), with a prior art type of engine having a pre-combustion chamber that communicates with the squish area through a fixed throttle (C2) and in accordance with this invention (C3).

The effect of this invention may be understood by reference to FIG. 9, which is a graphical showing the percent of combustion occurring in the entire combustion chamber in relation to crankshaft rotation in degrees. In this figure, the conventional engine having only a squish area is shown by the curve C1. It may be seen that the point of 90° combustion occurs relatively late and full combustion takes a large amount of crankshaft revolution, which may not be actually realized with most running conditions.

The curve C2 shows a squish arrangement also having a pre-chamber but with a restricted throat communication that has the problem of pumping losses as aforenoted. It may be seen with this type of arrangement, the 90% combustion is reached approximately 2° earlier than with a conventional engine, but there are the pumping loss problems and quenching that can cause pre-ignition or knocking, as aforenoted.

With this invention, as shown by the curve C3 it will be seen that 90% combustion chamber is achieved 7° of crankshaft rotation before the conventional engine and 5° of crankshaft rotation before a squish combustion chamber having a pre-chamber with a restricted throat. Also as may be seen in this figure, it is much more likely that there will be complete combustion occur during all running conditions utilizing this invention. In addition, not or pre-ignition are substantially precluded with this arrangement.

Figure 10:
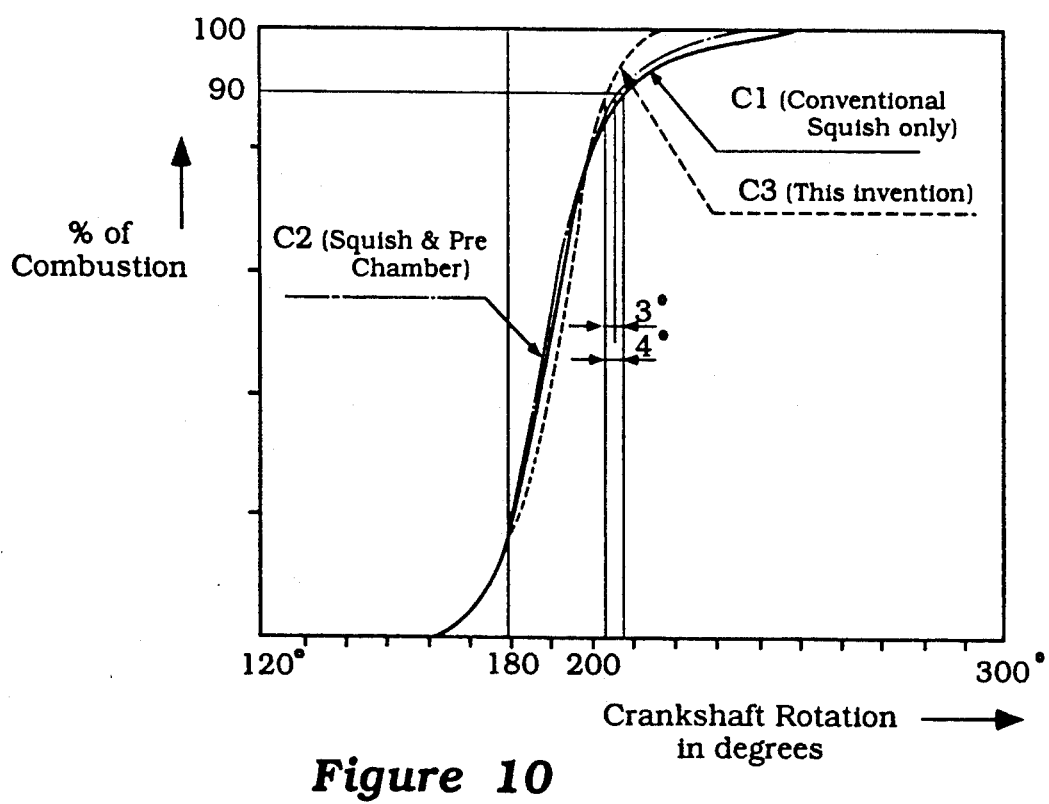
FIG. 10 is a graphically view, in part similar to FIG. 9, and shows the same conditions but when EGR is also employed with the engine.

FIG. 10 is a graphical view showing the effect when there is also provided EGR. It will be seen that generally the same characteristics follow and this combustion chamber provides a significantly improved performance from the prior art type of constructions.

In the embodiment of the invention as thus far described, the larger volume of squish area has been provided on the exhaust side of the engine by the squish area 73. When this is done, the positioning of the pre-chamber 74 on this side has additional advantages since the exhaust side of the cylinder head is hotter and without the pre-chamber 74 and flow channels 75, knocking can become a very real problem. However, the incorporation of the pre-chamber 74 avoids this problem due to the performance as aforedescribed.

Figure 11:
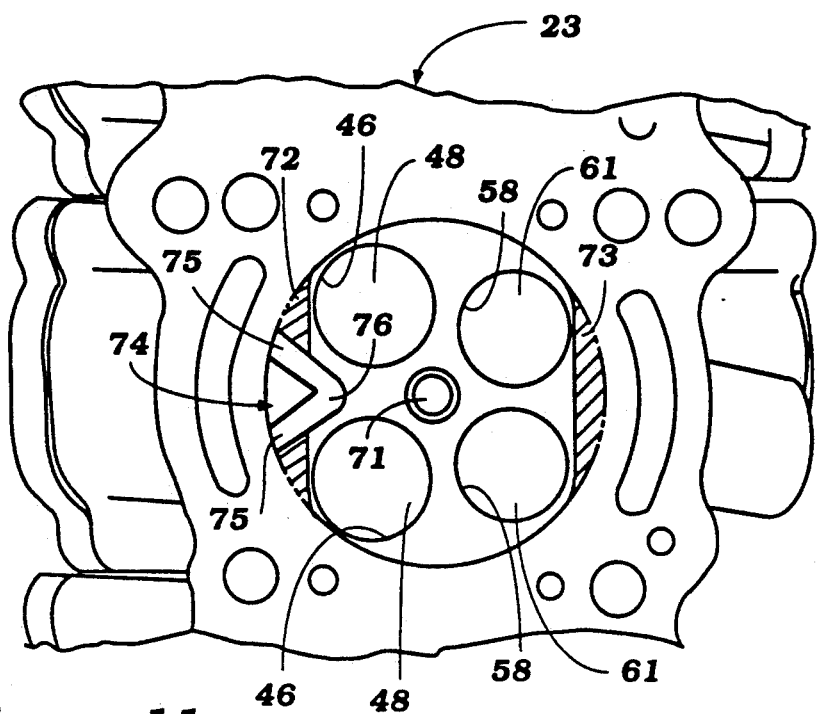
FIG. 11 is a view, in part similar to FIG. 4, and shows another embodiment of the invention.
Figure 12:
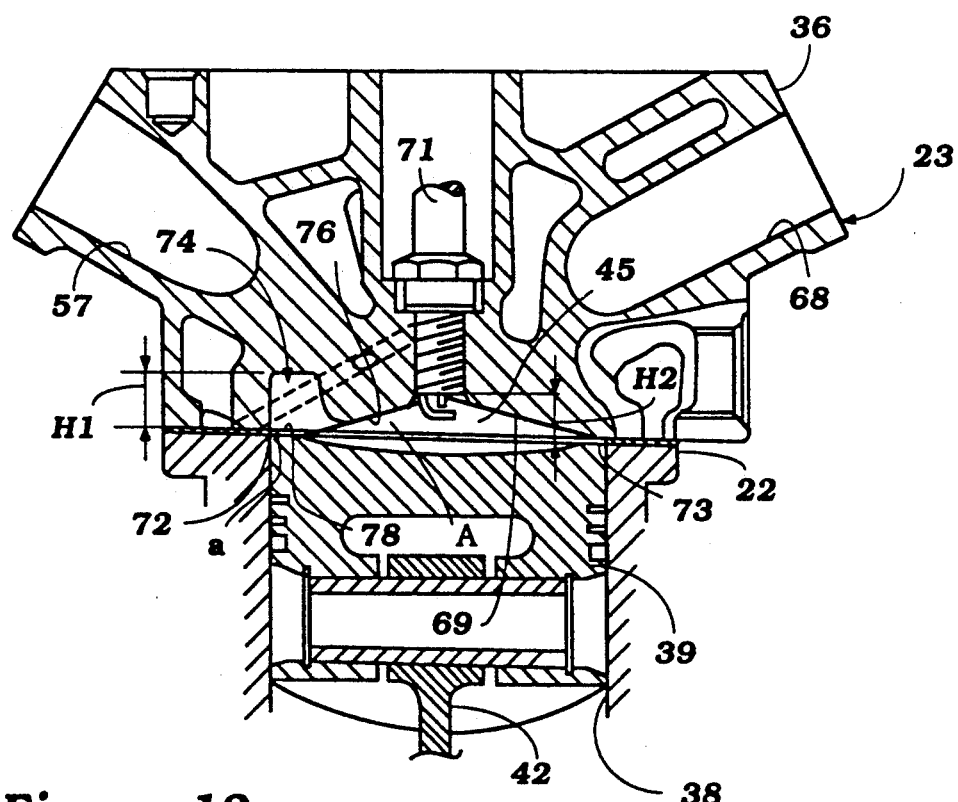
FIG. 12 is a cross sectional view, in part similar to FIG. 2, but for the embodiment of FIG. 11.

FIGS. 11 and 12 show another embodiment of the invention which is substantially the same as the embodiment thus far described. In this embodiment, however, the main combustion chamber recess 45 is offset toward the exhaust side of the engine so that the intake squish area 72 is substantially larger than the exhaust side squish area 73. Because of this smaller exhaust side squish area, the pre-chamber 74 is positioned in the area of the intake side squish area 72 with the aforenoted advantageous results. Because this is the only difference between these two embodiments, the same or similar parts have been identified by the same reference numerals and further description of this embodiment is believed to be unnecessary.

In the embodiments of the invention as thus far described, combustion has started in the pre-chamber 74 by the rapid increase in pressure in this chamber at top dead center and also by flame propagation from the main combustion chamber 45 into the pre-chamber 74 through the passages 75. If desired, an auxiliary spark plug 101 (FIGS. 13 and 14) may be provided in the pre-chamber with its spark gap 102 being disposed so as to face the center 76 of the flow channels or passages 75 and on a line connecting the gap of the spark plug 71 with the apex 76. In accordance with a preferred mode of operation, the spark plug 101 is fired slightly after the main spark plug 71 so as to insure that combustion will be initiated first in the pre-chamber 74. Because this embodiment is otherwise the same as the embodiments of FIGS. 1 through 8, further description of it is not believed to be necessary.

Figure 13:
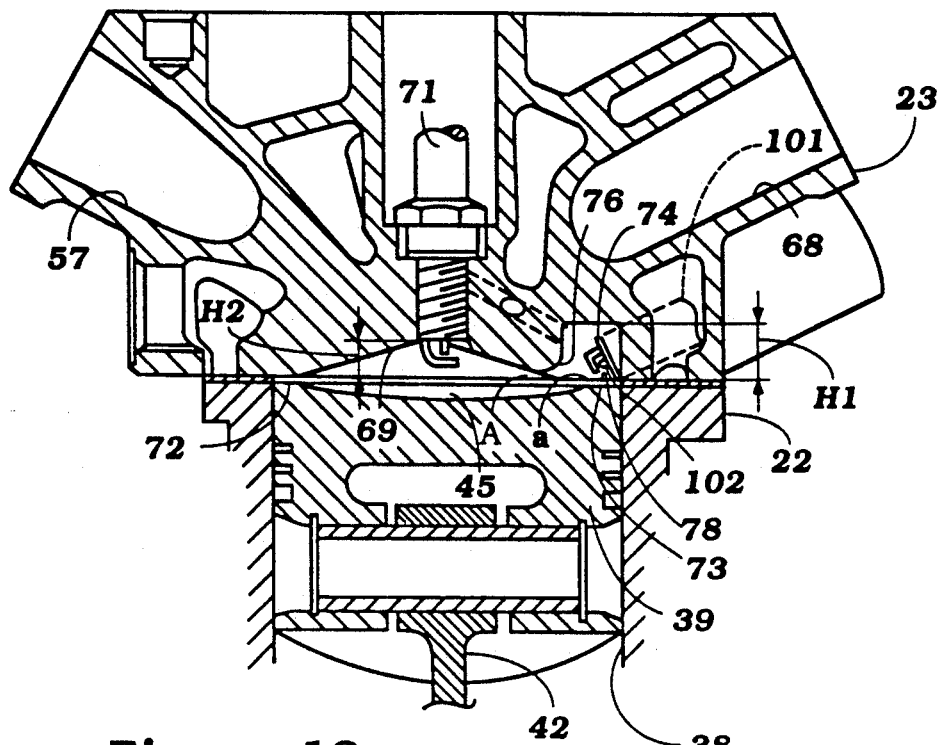
FIG. 13 is a cross sectional view, in part similar to FIGS. 2 and 12, and shows another embodiment of the invention.
Figure 14:
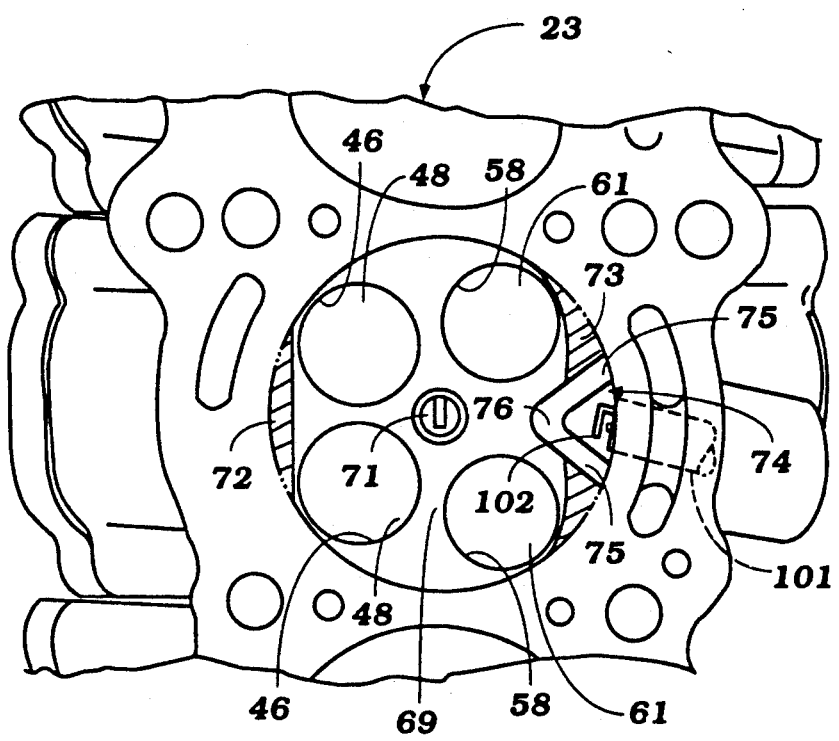
FIG. 14 is a bottom plan view of the cylinder head of this embodiment.
Figure 15:
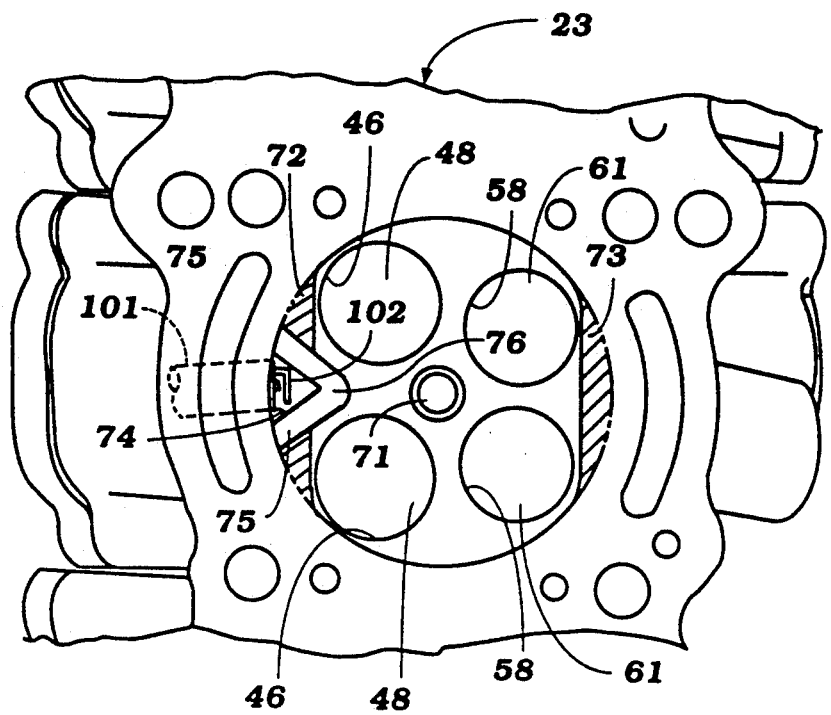
FIG. 15 is a bottom plan view of a cylinder head, in part similar to FIGS. 4, 11 and 14, and shows yet another embodiment of the invention.
Figure 16:
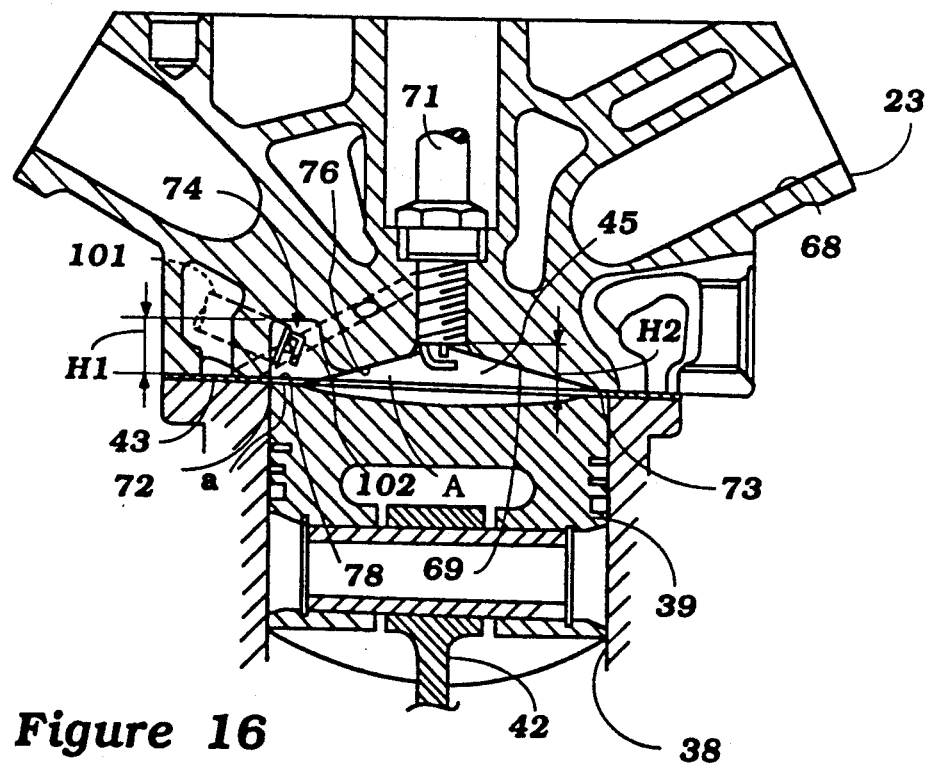
FIG. 16 is a cross sectional view, in part similar to FIGS. 2, 12 and 13, for the embodiment of FIG. 15.

FIGS. 15 and 16 show an embodiment similar to the embodiment of FIGS. 11 and 12 but again an auxiliary spark plug 101 is provided in the intake side pre-chamber 74 for the same reason as with the embodiments of FIGS. 13 and 14.

It should be readily apparent that the described construction permits the use of a squish area and the advantages thereof in providing good turbulence in the main combustion chamber while, at the same time, avoiding the problems of quenching, incomplete combustion and possible knocking with conventional squish constructions. In addition, since the flow passages that communicate the pre-chamber with the main chamber are substantially unrestricted except at top dead center position, no pumping losses occur.

It is to be understood that the foregoing description is that of preferred embodiments of the invention and that various changes and modifications may be made without departing from the spirit and scope of the invention, as defined by the appended claims.

I claim:

1. A combustion chamber for an internal combustion engine comprised of a pair of relatively movable components defining a combustion chamber, said combustion chamber, at minimum volume condition, being comprised of a main combustion chamber volume, a squish area of substantially lesser height than said main combustion chamber on at least one side of said main combustion chamber volume, a pre-chamber volume of greater height than said squish area and of a lesser cross section than said squish area, a flow passage extending from said main combustion chamber volume to said pre-chamber volume for flow therethrough, said squish area being spaced from said pre-chamber by said flow passage, said flow passage being substantially unrestricted until said relatively movable components approach their minimum volume condition for promoting the flow of mixture into said pre-chamber volume as minimum volume condition is approached and for delivering a burnt charge into said squish area after combustion occurs in said pre-chamber volume, the squish action of said squish area as said components approach their minimum volume condition promoting a flow of high velocity mixture from said squish area into said main combustion chamber, and means for firing a charge in said pre-chamber volume.

2. A combustion chamber for an internal combustion engine as set forth in claim 1 further including a spark plug mounted in the main combustion chamber volume.

3. A combustion chamber for an internal combustion engine as set forth in claim 2 wherein the means for firing the charge in the pre-chamber volume comprises a sub-spark plug positioned in the pre-chamber volume and means for firing said spark plug and subsequently firing said sub-spark plug after the spark plug in the main combustion chamber volume.

4. A combustion chamber for an internal combustion engine as set forth in claim 1 wherein the engine comprises a reciprocating engine and where the first component comprises a cylinder block defining a cylinder bore and a cylinder head fixed to the cylinder block and closing the cylinder bore and the other component comprises a piston reciprocating in said cylinder bore, said engine being a four cycle engine with an intake valve on an intake side of said main combustion chamber volume and an exhaust valve on an exhaust side of said main combustion chamber volume.

5. A combustion chamber for an internal combustion engine as set forth in claim 4 wherein the squish area is formed adjacent one of the valves.

6. A combustion chamber for an internal combustion engine as set forth in claim 5 wherein the main combustion chamber volume is offset to one side of the cylinder bore for forming the squish area.

7. A combustion chamber for an internal combustion engine as set forth in claim 6 wherein the squish area is formed on the intake side of the cylinder head.

8. A combustion chamber for an internal combustion engine comprised of a pair of relatively movable components defining a combustion chamber, said combustion chamber, at minimum volume condition, being comprised of a main combustion chamber volume, a squish area of substantially lesser height than said main combustion chamber on at least one side of said main combustion chamber volume, a pre-chamber volume of greater height than said squish area, and a flow passage extending from said main combustion chamber volume to said pre-chamber volume for flow therethrough, said flow passage being substantially unrestricted until said relatively movable components approach their minimum volume condition for promoting the flow of mixture into said pre-chamber volume as minimum volume condition is approached and for delivering a burnt charge into said squish area after combustion occurs in said pre-chamber volume, said flow passage comprises a pair of angularly disposed flow passages.

9. A combustion chamber for an internal combustion engine as set forth in claim 8 wherein the flow passages and the pre-chamber volume are formed in a component that does not move.

10. A combustion chamber for an internal combustion engine as set forth in claim 9 further including a spark plug mounted in the main combustion chamber volume in line with the intersection of the flow passages.

11. A combustion chamber for an internal combustion engine as set forth in claim 10 further including a sub-spark plug positioned in the pre-chamber volume and and means for firing said spark plug and subsequently firing said sub-spark plug after the spark plug in the main combustion chamber volume.

12. A combustion chamber for a reciprocating four cycle internal combustion engine comprised of a cylinder block defining a cylinder bore, a cylinder head affixed to said cylinder block and closing said cylinder bore, a piston reciprocating in said cylinder bore to define a combustion chamber, said combustion chamber, at minimum volume condition, being comprised of a main combustion chamber volume, a squish area of substantially lesser height than said main combustion chamber on at least one side of said main combustion chamber volume, a pre-chamber volume of greater height than said squish area, a flow passage extending from said main combustion chamber volume to said pre-chamber volume for flow therethrough, said flow passage being substantially unrestricted until said relatively movable components approach their minimum volume condition for promoting the flow of mixture into said pre-chamber volume as minimum volume condition is approached and for delivering a burnt charge into said squish area after combustion occurs in said pre-chamber volume, the squish action of said squish area as said components approach their minimum volume condition promoting a flow of high velocity mixture from said squish area into said main combustion chamber, said main combustion chamber volume being offset to one side of said cylinder bore for forming said squish area, said squish area being formed on the exhaust side of the cylinder head.

13. A combustion chamber for an internal combustion engine comprised of a cylinder block defining a cylinder bore, a cylinder head affixed to said cylinder block and closing said cylinder bore, a piston reciprocating in said cylinder bore to define a combustion chamber, said combustion chamber, at minimum volume condition, being comprised of a main combustion chamber volume, a pair of squish areas of substantially lesser height than said main combustion chamber, at least one pre-chamber volume of greater height than the respective of said squish areas, and a flow passage extending from said main combustion chamber volume to said pre-chamber volume for flow therethrough, said flow passage being substantially unrestricted until said relatively movable components approach their minimum volume condition for promoting the flow of mixture into said pre-chamber volume as minimum volume condition is approached and for delivering a burnt charge into said squish area after combustion occurs in said pre-chamber volume, the squish action of said squish areas as said components approach their minimum volume condition promoting a flow of high velocity mixture from said squish areas into said main combustion chamber, said squish areas being formed on both sides of said cylinder head.

14. A combustion chamber for an internal combustion engine as set forth in claim 13 wherein one of the squish areas is larger than the other of these squish area and the pre-chamber volume communicates with only the larger squish area.

15. A combustion chamber for an internal combustion engine as set forth in claim 14 wherein one of the squish areas is formed on the exhaust side of the cylinder head.

16. A combustion chamber for an internal combustion engine as set forth in claim 14 wherein one of the squish areas is formed on the intake side of the cylinder head.

* * * * *